(12) United States Patent
Ko et al.

(10) Patent No.: US 6,884,746 B2
(45) Date of Patent: Apr. 26, 2005

(54) CATALYSTS FOR OLEFIN POLYMERIZATION AND METHOD OF OLEFIN POLYMERIZATION USING THE SAME

(75) Inventors: Young-Soo Ko, Seoul (KR); Ki-Su Ro, Taejon-shi (KR); Young-Jun Lee, Taejon-shi (KR); Yong Chun, Taejon-shi (KR)

(73) Assignee: Samsung General Chemicals, Co., Ltd., Chungcheongnam Province (KR)

( * ) Notice: Subject to any disclaimer, the term of this patent is extended or adjusted under 35 U.S.C. 154(b) by 89 days.

(21) Appl. No.: 10/311,416

(22) PCT Filed: Jun. 14, 2001

(86) PCT No.: PCT/KR01/01021

§ 371 (c)(1),
(2), (4) Date: Aug. 13, 2003

(87) PCT Pub. No.: WO01/98375

PCT Pub. Date: Dec. 27, 2001

(65) Prior Publication Data

US 2004/0014594 A1 Jan. 22, 2004

(30) Foreign Application Priority Data

Jun. 17, 2000 (KR) .......................... 2000/33429

(51) Int. Cl.$^7$ .......................... B01J 31/00; B01J 37/00; C02F 4/02; C02F 4/60
(52) U.S. Cl. .......................... 502/103; 502/104; 502/232; 524/3; 525/50; 526/124.5
(58) Field of Search .............................. 502/103, 104, 502/232; 524/3; 525/50; 526/124.5

(56) References Cited

U.S. PATENT DOCUMENTS

| 3,332,927 A | 7/1967 | Cottingham |
| 3,632,620 A | 1/1972 | Kober et al. |
| 3,642,746 A | 2/1972 | Kashiwa et al. |
| 3,642,772 A | 2/1972 | Haid et al. |
| 3,878,124 A | 4/1975 | Durand et al. |
| 3,899,477 A | 8/1975 | Altemore et al. |
| 3,953,414 A | 4/1976 | Galli et al. |

(Continued)

FOREIGN PATENT DOCUMENTS

| DE | 2553104 | 6/1977 |
| DE | 3636060 | 5/1988 |
| EP | 131832 | 5/1987 |
| EP | 0 131 832 | 5/1987 |
| EP | 0385765 | 9/1990 |
| EP | 0 385 765 | 9/1990 |
| EP | 0 350 170 | 3/1994 |
| EP | 0 602 922 | 6/1994 |
| EP | 0 606 125 | 5/1997 |
| EP | 0 669 347 | 5/1998 |
| GB | 1335887 | 10/1973 |
| GB | 1492618 | 11/1977 |
| GB | 1577643 | 10/1980 |
| JP | 51-136625 | 11/1976 |
| JP | 52-111528 | 9/1977 |
| JP | 61055103 | 3/1986 |
| JP | 61268714 | 11/1986 |
| JP | 63-191811 | 8/1988 |
| JP | 63199703 | 8/1988 |
| JP | 6354004 | 10/1988 |
| JP | 63308003 | 12/1988 |
| JP | 6340711 | 12/1994 |
| JP | 09-176226 | 7/1995 |
| WO | WO 00/73355 | 12/2000 |
| WO | WO 00/73356 | 12/2000 |
| WO | WO 01/32718 | 5/2001 |

OTHER PUBLICATIONS

Stokes et al., "Reactions of Cobaloxime Anions and/or Hydrides with Enynes as a New, General Route to 1, 3– and 1,2–Dienylcobaloxime Complexes," Organometallics, 1996, vol. 15, pp. 2624–2632.

Tinkler et al., "Polymerisation of ethene by the novel titanium complex [Ti(Me$_3$SiNCH$_2$CH$_2$NSiMe$_3$)Cl$_2$]; a metallocene analogue," Chem. Commun., 1996, pp. 2623–2624.

Edelmann, "N–silylated benzamidines: Versatile building blocks in main group and coordination chemistry," Coordination Chemistry Reviews, vol. 137, 1994, pp. 403–481.

Zhou et al., "Synthesis and Structure of Novel Bridged Dinuclear Indium Complexes," Inorg. Chem., 1996, vol. 35, pp. 1423–1424.

Zhou et al., "Bulky Amidinate Complexes of Tin(IV). Synthesis and Structure of Sn(RNC(R')NR)$_2$Cl$_2$ (R=Cyclohexyl, R'=H, Me; R=SiMe$_3$, R'=$^1$Bu)," Inorg. Chem., 1997, vol. 36, pp. 501–504.

Linden et al., "Polymerization of α–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Phenoxide Titanium and Zirconium Species," J. Am. Chem. Soc., 1995, vol. 117, pp. 3008–3021.

Averbuj et al. "Stereoregular Polymerization of a–Olefins Catalyzed by Chiral Group 4 Benzamidinate Complexes of C1 and C3 Symmetry" J. Am. Chem. Soc, 1998, vol. 120, 8640–8646.

Primary Examiner—Mark L. Bell
Assistant Examiner—Jennine M. Brown
(74) Attorney, Agent, or Firm—Meyertons, Hood, Kivlin, Kowert & Goetzel, P.C.; Eric B. Meyertons

(57) ABSTRACT

Described herein is a prepolymerized catalyst encapsulated with macromolecular monomers which is prepared by adding olefin mononers and diene compounds to a solid complex titanium catalyst for olefin polymerization and then polymerizing, and also relates to a method for polymerization or copolymerization capable of preparing polyolefins with high melt strength by polymerizing the olefin by using said catalyst.

16 Claims, No Drawings

U.S. PATENT DOCUMENTS

| | | |
|---|---|---|
| 4,013,823 A | 3/1977 | Longi et al. |
| 4,069,169 A | 1/1978 | Toyota et al. |
| 4,071,672 A | 1/1978 | Kashiwa |
| 4,071,674 A | 1/1978 | Kashiwa et al. |
| 4,076,924 A | 2/1978 | Toyota et al. |
| 4,085,276 A | 4/1978 | Toyota et al. |
| 4,107,413 A | 8/1978 | Giannini et al. |
| 4,107,414 A | 8/1978 | Giannini et al. |
| 4,107,415 A | 8/1978 | Giannini et al. |
| 4,111,835 A | 9/1978 | Foschini et al. |
| 4,148,756 A | 4/1979 | Langer, Jr. |
| 4,156,063 A | 5/1979 | Giannini et al. |
| 4,157,435 A | 6/1979 | Toyota et al. |
| 4,158,642 A | 6/1979 | Langer, Jr. |
| 4,187,196 A | 2/1980 | Giannini et al. |
| 4,220,554 A | 9/1980 | Scatt et al. |
| 4,226,963 A | 10/1980 | Giannini et al. |
| 4,263,169 A | 4/1981 | Scata et al. |
| 4,277,372 A | 7/1981 | Matlack |
| 4,315,835 A | 2/1982 | Scatt et al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,380,507 A | 4/1983 | Noristi et al. |
| 4,384,983 A | 5/1983 | Hoff |
| 4,390,671 A | 6/1983 | Imai et al. |
| 4,399,054 A | 8/1983 | Ferraris et al. |
| 4,401,589 A | 8/1983 | Kioka et al. |
| 4,434,282 A | 2/1984 | Esneault |
| 4,439,540 A | 3/1984 | Cecchin et al. |
| 4,477,639 A | 10/1984 | Nielsen |
| 4,482,687 A | 11/1984 | Noshay et al. |
| 4,487,846 A | 12/1984 | Bailly et al. |
| 4,514,513 A | 4/1985 | Sato et al. |
| 4,518,706 A | 5/1985 | Gessell |
| 4,529,716 A | 7/1985 | Banzi et al. |
| 4,579,833 A | 4/1986 | Collomb et al. |
| 4,613,655 A | 9/1986 | Longi et al. |
| 4,614,727 A | 9/1986 | Longi et al. |
| 4,642,328 A | 2/1987 | Morterol et al. |
| 4,673,719 A | 6/1987 | Kioka et al. |
| 4,761,392 A | 8/1988 | Shiga et al. |
| 4,777,639 A | 10/1988 | Whitehouse |
| 4,806,433 A | 2/1989 | Sasaki et al. |
| 4,816,433 A | 3/1989 | Terano et al. |
| 4,829,037 A | 5/1989 | Terano et al. |
| 4,843,049 A | 6/1989 | Invernizzi et al. |
| 4,847,227 A | 7/1989 | Murai et al. |
| 4,847,639 A | 7/1989 | Sugata et al. |
| 4,866,022 A | 9/1989 | Arzoumanidis et al. |
| 4,912,074 A | 3/1990 | Miro |
| 4,946,816 A | 8/1990 | Cohen et al. |
| 4,952,649 A | 8/1990 | Kioka et al. |
| 4,962,167 A | 10/1990 | Shiraishi et al. |
| 4,970,186 A | 11/1990 | Terano et al. |
| 4,978,648 A | 12/1990 | Barb |
| 4,988,656 A | 1/1991 | Arzoumanidis et al. |
| 4,990,479 A | 2/1991 | Ishimaru et al. |
| 5,006,499 A | 4/1991 | Daire |
| 5,013,702 A | 5/1991 | Arzoumanidis et al. |
| 5,061,667 A | 10/1991 | Murata et al. |
| 5,064,798 A | 11/1991 | Chang |
| 5,081,090 A | 1/1992 | Arzoumanidis et al. |
| 5,104,838 A | 4/1992 | Fujita et al. |
| 5,106,807 A | 4/1992 | Morini et al. |
| 5,124,297 A | 6/1992 | Arzoumanidis et al. |
| 5,130,284 A | 7/1992 | Terano et al. |
| 5,134,104 A | 7/1992 | Sasaki et al. |
| 5,175,332 A | 12/1992 | Chatterton et al. |
| 5,182,245 A | 1/1993 | Arzoumanidis et al. |
| 5,244,996 A | 9/1993 | Kawasaki et al. |
| 5,346,872 A | 9/1994 | Menon et al. |
| 5,419,116 A | 5/1995 | Rast et al. |
| 5,439,995 A | 8/1995 | Bailly et al. |
| 5,455,316 A | 10/1995 | Tsutsui et al. |
| 5,459,116 A | 10/1995 | Ro et al. |
| 5,498,770 A | 3/1996 | Hosaka et al. |
| 5,502,128 A | 3/1996 | Flores et al. |
| 5,585,317 A | 12/1996 | Sacchetti et al. |
| 5,587,436 A | 12/1996 | Klimek et al. |
| 5,587,440 A | 12/1996 | Ehlers et al. |
| 5,604,171 A * | 2/1997 | Collette et al. ............. 502/120 |
| 5,643,845 A | 7/1997 | Tajima et al. |
| 5,696,044 A | 12/1997 | Zakharov et al. |
| 5,726,261 A | 3/1998 | Sacchetti et al. |
| 5,780,378 A | 7/1998 | Toida et al. |
| 5,798,424 A | 8/1998 | Kong et al. |
| 5,817,591 A | 10/1998 | Shamshoum et al. |
| 5,844,046 A | 12/1998 | Ohgizawa et al. |
| 5,849,654 A | 12/1998 | Fushimi et al. |
| 5,849,655 A | 12/1998 | Shamshoum et al. |
| 5,869,418 A | 2/1999 | Iiskola et al. |
| 5,877,265 A | 3/1999 | Toida et al. |
| 5,880,056 A | 3/1999 | Tsutsui et al. |
| 5,936,049 A | 8/1999 | Kojoh et al. |
| 5,965,478 A | 10/1999 | Goto et al. |
| 5,968,862 A | 10/1999 | Abbott et al. |
| 6,020,449 A * | 2/2000 | Scheim ........................ 528/34 |
| 6,034,025 A | 3/2000 | Yang et al. |
| 6,066,702 A | 5/2000 | Ro et al. |
| 6,090,873 A * | 7/2000 | Okibe et al. ................ 524/265 |
| 6,111,038 A | 8/2000 | Kioka et al. |
| 6,114,276 A | 9/2000 | Kong et al. |
| 6,271,299 B1 * | 8/2001 | Alvarez et al. ............. 524/456 |
| 6,303,715 B1 * | 10/2001 | Kim et al. .................. 526/128 |
| 6,329,456 B1 * | 12/2001 | Okibe et al. ................ 524/264 |
| 6,489,383 B1 * | 12/2002 | Wood et al. ................. 524/91 |
| 6,559,250 B1 * | 5/2003 | Ro et al. ................. 526/124.3 |
| 6,561,807 B1 * | 5/2003 | Hare ......................... 433/214 |

\* cited by examiner

CATALYSTS FOR OLEFIN POLYMERIZATION AND METHOD OF OLEFIN POLYMERIZATION USING THE SAME

TECHNICAL FIELD

The present invention relates to a catalyst for forming an α-olefin polymer with high melt strength and a method of olefin polymerization by using this catalyst. More particularly, it relates to a prepolymerized catalyst that includes a macromonomer encapsulated around the catalyst, and a method for polymerization of polyolefin with high melt strength by using this encapsulated catalyst.

BACKGROUND OF THE INVENTION

The conventional linear form of polypropylene is typically not suitable for processes which are conducted in a melt state (for example, foaming, heat molding, extrusion coating, etc.) because of its low melt strength in comparison with polyethylene. However, when long chain branching is introduced onto the linear polyolefins, the branched polyolefin shows high melt strength and easy flow properties by reducing attraction forces between macromolecular chains during the processing. The branched polyolefin also exhibits increased melt strength by crosslinking between neighboring long chains during molding processes (especially, for uses requiring value stabilities such as a large scale blow molding). General methods for producing high melt strength polyolefins by introducing long chain branches, include: forming radicals of polyolefins coming out of polymerization reaction vessels through electronic radiation or a reaction extrusion method, reacting these radicals and thereby forming long chain branches in chain type polyolefins. If a polymerization method capable of directly polymerizing polyolefins useful as molding material and with high melt strength during polymerization steps could be developed, it is expected that the use of polyolefin as molding materials would be expanded.

SUMMARY OF THE INVENTION

In one embodiment, an olefin polymerization method capable of producing polyoefins with high melt strength by introducing long branches into the polymer during polymerization includes synthesizing polymerization catalysts including functionalized active site where a long chain branch may be introduced and a macromolecular monomer and thereafter using these catalysts in a polyolefin polymerization process.

DETAILED DESCRIPTION OF THE EMBODIMENTS OF THE INVENTION

Described herein is a catalyst encapsulated with macromonomers around it (referred to as 'prepolymerized catalyst' herein) and which is capable of forming branches to olefin polymers, wherein the catalyst is prepared by prepolymerization of a solid titanium catalyst for olefin polymerization with olefin/multifunctional compounds, and also relates to a method for high melt strength polyolefin polymerization by using said prepolymerized catalyst.

The term "polymerization" herein has the meaning including preparation of copolymers of an olefin with other α-olefins as well as preparation of monopolymers of an olefin.

The prepolymerized catalyst, has good catalyst activities, and is capable of forming a polymer having broad molecular weight distribution and high stereoregularity and also capable of forming long chain branches to the resulting polyolefins.

The prepolymerized catalyst, is prepared by surface treating a solid titanium catalyst for olefin polymerization with silane compounds having two or more double bonds, and then conducting prepolymerization reactions by mixing said surface treated catalyst with diene compounds and thereby encapsulating the catalyst by polymerizing the macromonomer.

As the solid titanium catalysts used in the preparation of said prepolymerized catalyst, any conventional solid titanium catalyst for polyolefin polymerization may be used, and it may be prepared by various methods. For example, it may be prepared by directly contacting the magnesium compounds free of reducibility with the titanium compound in a liquid state in the presence of electron donors not having an active hydrogen. i.e, directly contacting each said reactants in the liquid state, or it may be prepared by forming a solid catalyst with magnesium compounds and titanium catalyst in the absence of electron donors having no active hydrogen and then reacting by contacting the catalyst thus obtained with electron donors.

Among the preparation methods of solid titanium catalyst used in the preparation of the prepolymerized catalyst, the most common methods include, for example, contacting magnesium compounds with titanium compounds having at least one or more halogen atoms, and if necessary, treating the products thus obtained with electron donors. Some of above methods are described in German Patent Laid open Nos. 2,230,672; 2,504,036; 2,553,104; and 2,605,922 and Japanese Patent Laid open Nos. 51-28189; 51-136625; and 52-87486. Further, a method for preparing solid titanium compounds containing electron donors from titanium compounds in a liquid state which is derived from liquid state magnesium is described in Japanese Patent Laid open No. 79-40293.

Also, as a solid titanium catalyst used in the preparation of the prepolymerized catalyst, conventional Ziegler-Natta catalysts, which are described in U.S. Pat. Nos. 4,482,687; 4,277,372; 3,642,746; 3,642,772; 4,158,642; 4,148,756; 4,477,639; 4,518,706; 4,946,816; 4,866,022; 5,013,702; 5,124,297; 4,330,649 all of which are incorporated herein by reference; European Patent No. 131,832; Japanese Patent Laid open Shou 63-54004 etc., may be used.

One example among the many methods for preparing the solid titanium catalyst is as follows: A magnesium supported solid complex titanium catalyst was prepared by a method that includes (i) preparing a magnesium compound solution by dissolving magnesium compounds having no reducibility into electron donors, (ii) reacting the magnesium solution with transition metal compounds, silicone compounds, tin compounds or a mixture thereof and thereby precipitating solid particles, (iii), reacting the precipitated solid particles with titanium compounds and electron donors; then washing the precipitated-particles with a hydrocarbon and thereby preparing solid catalyst particles having controlled particle types.

The magnesium compounds having no reducibility used in the preparation of a solid titanium catalyst as above includes magnesium halides such as magnesium chloride, magnesium bromide, magnesium iodide and magnesium fluoride, alkoxy magnesium halides such as methoxy magnesium chloride, ethoxy magnesium chloride, isopropoxy magnesium chloride, butoxy magnesium chloride and octoxy magnesium chloride, aryloxy magnesium halides such as phenoxy magnesium chloride and methylphenoxy magnesium chloride, alkoxy magnesium such as ethoxy magnesium, isopropoxy magnesium, butoxy magnesium and octoxy magnesium, aryloxy magnesium such as phenoxy magnesium and dimethyl magnesium and magnesium salts of carboxylic acid such as lauryl magnesium and stearic acid magnesium.

These magnesium compounds may be used in the form of a complex compound of other metals or with a mixture of other metals, or a mixture of two or more magnesium compounds. Preferably, these magnesium compounds are magnesium compounds containing hydrogen, magnesium chloride, alkoxy magnesium chloride, preferably alkoxy magnesium chloride having $C_1$ through $C_{14}$ alkoxy groups and aryloxy magnesium chloride, preferably aryloxy magnesium chloride having $C_5$ to $C_{20}$ aryloxy groups.

Generally, the above mentioned compounds may be represented as a simple chemical formula, however, sometimes there is a case that it can not be represented as such according to the method for their preparation. Such compounds are generally considered to be a mixture of above mentioned compounds. For example, compounds obtained by a method of reacting magnesium compounds with alcohols or phenols in the presence of a halosilane, a phosphate pentachloride or a thionyl chloride and by pyrolysis of Grignard reagent or a degradation method using hydroxyl groups, carbonyl ester bond, ether bond or similar kind of compounds produce a mixture of various compounds depending on the reagents or degree of reaction. These compounds also may be used in the preparation of the magnesium supported solid complex titanium catalyst.

The magnesium compounds are reacted with one or more electron donors which are selected from the group consisting of alcohols, organic carboxylic acids, aldehydes, amines and mixtures thereof, and thereby producing a solution of magnesium compounds. A solution of magnesium compounds can be produced by mixing hydrocarbon solvent with electron donors and then heating them. Examples of hydrocarbon solvents include aliphatic hydrocarbons such as pentane, hexane, heptane, octane, decane, dodecane and kerosene, cyclic hydrocarbones such as cyclopentane, methycyclopentane, cyclohexane and methylcyclohexane, aromatic hydrocarbons such as benzene, toluene, xylene, ethylbenzene, cumene and cymene and halo hydrocarbons such as dichloroethane, dichloropropane, dichloroethylene, trichloroetylene, tetrachlorocarbon and chlorobenzene.

In the step (i) of preparing a solution of magnesium compounds, when alcohol is used as an electron donor to dissolve magnesium compounds having hydrogen in hydrocarbon solvents, the suitable alcohols/magnesium compounds molar ratio is at least 0.5, preferably about 1.0 to 20, more preferably about 2.0 to about 10.

When aliphatic hydrocarbons or cyclic hydrocarbons are used as hydrocarbon solvents, alcohols are used in above mentioned amounts, however, if alcohols having 6 or more carbon atoms among these alcohols are used and the alcohols/magnesium compounds molar ratio is at least 0.5, preferably 1 or more, of the magnesium compounds having a halogen may be dissolved and catalyst components having high performances can be obtained by using small amount of alcohols. If alcohols having 5 or less carbon atoms are used, the total amount of alcohols should be at least about 15 moles per magnesium compounds having halogen, and the catalyst components thus obtained have catalytic activities less than those obtained by using alcohols of the previously mentioned method. On the other hand, when aromatic hydrocarbons are used as hydrocarbon solvents, magnesium compounds having hydrogen can be dissolved by using about 20 moles, preferably about 1.5 to 12 moles per magnesium compounds having hydrogen irrespective of the types of alcohols.

The reaction of contacting magnesium compounds with electron donor alcohols is conducted in in a hydrocarbon. These contacting reactions are carried out at room temperature or high temperature, for example, about 30° C. to 200° C., preferably about 60° C. to 150° C. for about 15 minutes to about 5 hours, preferably about 30 minutes to about 3 hours.

Examples of alcohols used as electron donor in the step (i) include aliphatic alcohols having at least 6 carbon atoms, preferably 6 to 20 carbon atoms such as 2-methylpentanol, 2-ethylbutanol, n-heptanol, n-octanol, 2-ethylhexanol, decanol, dodecanol, tetradecyl alcohol, undecenol, oleyl alcohol and stearyl alcohol, cyclic alcohols such as cyclohexanol and methylcyclohexanol and aromatic alcohols such as benzyl alcohol, methylbenzyl alcohol, isopropylenebenzyl alcohol, α-methylbenzyl alcohol and α,α-dimethylbenzyl alcohol. Examples of alcohols having 5 or less carbon atoms include methanol, ethanol, propanol, butanol, ethyleneglycol and methylcarbitol.

The solutions of magnesium compounds thus obtained are reacted with transition metal compounds such as titanium compounds, silicon compounds, tin compounds or mixtures thereof and then crystallizes into a globular solid material (step (ii)). At this time, the amount of the transition metal etc used may be suitably changed. For example, the suitable amount of transition metal compounds, silicon compounds, tin compounds or mixtures thereof per 1 mole of magnesium compounds is in the range of 0.1 mole to 20 mole, preferably 0.1 mole to 10 mole, more preferably 0.2 mole to 2 mole.

In the step (ii), when the magnesium compounds in the liquid state are crystallized, the shape and size of the magnesium carrier changes according to the reaction conditions, and preferably, the temperature of contacting reaction is in the range of about −70° C. to 200° C. However, it is preferable that this reaction is conducted in the range of about 20° C. to 150° C. because it is generally preferable to avoid high temperature during the mixing process to obtain particulate or globular type precipitate. In some embodiments, the precipitation of solid products does not occur if the contacting temperature is too high.

Solid complex titanium catalyst is produced by reacting magnesium compounds in the solid particulate state with titanium compounds and electron donors (step (iii)). Examples of electron donors used in this step include, generally, electron donors having an oxygen atom such as water, alcohols, phenols, ketones, aldehydes, carboxylic acids, esters and acid amides, electron donors having nitrogen atoms such as ammonia, amines, nitrites and isocyanic acid salts, more particularly alcohols having 1 to 18 carbon atoms such as methanol, ethanol, propanol, pentanol, hexanol, octanol, dodecanol, octadecyl alcohol, benzyl alcohol, phenylethyl alcohol, cumyl alcohol and isopropylbenzyl alcohol, ketones having 6 to 15 carbon atoms which is capable of having lower phenyl groups such as phenol, cresol, xylene, ethylphenol, propylphenol, cumylphenyl and naphthol, aldehydes having 2 to 15 carbon atoms such as acetaldehyde, propionylaldehyde, octylaldehyde, benzaldehyde, toluyl aldehyde and naphthaldehyde, organic acid esters having 2 to 18 carbon atoms such as methylformate, methylacetate, vinylacetate, propylacetate, octylacetate, cyclohexylacetate, ethylpropionate, methylbutyrate, ethylvalerate, methylchloroacetate, ethyldichloroacetate, methylmethacrylate, ethylcrotonate, ethylcyclohexylcarboxylate, phenylsalicylate, methyltoluate, ethyltoluate, amyltoluate, ethylethylsalicylate, methylanistate, ethylanistate, ethylethoxysalicylate, γ-buyrolactone, δ-butyrolactone, coumarine, phthalate, cyclohexylacetate, methylvalerate, etyhlcitrate, phenylbenzoate, propylbenzoate, butylbenzoate, cyclohexylbenzoate and ethylene carbonate, acid halides having 2 to 15 carbon atoms such as acetylchoride, benzylchoride, toluylchloride and anisylchloride, ethers such as methylether, ethylether, isopropylether, butylether, amylether, tetrahydrofuran, anisole and diphenylether, amines such as methylamine, ethylamine, diethylamine, tributylamine, piperidine, tribenzylamine, aniline, pyridine, pyrrolidine and tetramethylethylenediamine, nitriles such as acetonitrile, benzonitrile and tolunitrile and compounds of aluminum, silicon and tin etc having above mentioned functional groups within the molecules. Also, ester derivatives of monoethyleneglycol(MEG), diethyleneglycol(DEG), triethyleneglycol(TEG), polyethyleneglycol(PEG), monopropyleneglycol(MPG) and dipropyleneglycol(DPG) such as of acetate, propionate, n- and iso-butyrate, benzoate, toluate etc can preferably be used. Examples of these benzoate ester derivatives include monoethyleneglycolmonobenzoate, monoethyleneglycoldibenzoate, diethyleneglycolmonobenzoate, diethyleneglycoldibenzoate, triethyleneglycolmonobenzoate, triethyleneglycoldibenzoate, monopropyleneglycolmonobenzoate, dipropyleneglycolmonobenzoate, dipropyleneglycoldibenzoate, tripropyleneglycolmonobenzoate etc. These electron donors can be used as a mixture of 2 or more thereof, preferably, esters of aromatic compounds are suitable. However, these electron donors are not always needed as starting materials and they can be used as adducts of other compounds or complex compounds. The amount of these electron donors may be correspondingly changed, and may be used, preferably, in the range of about 0.001 mole to about 10 moles, more preferably, 0.01 mole to 5 moles, most preferably, 0.05 to about 1, per mole of the magnesium compounds.

Examples of the titanium compounds in the liquid state to be reacted with the magnesium compounds in the solid particulate state in the step (iii) are preferably tetravalent titanium compounds of the formula $Ti(OR)_m X_{4-m}$ (wherein R represents hydrocarbon group having 1 to 10 carbon atoms, X represents a halogen atom and m is a number represented by $0 \leq m \leq 4$). Examples of these titanium compounds are titanium tetrahalides such as $TiCl_4$, $TiBr_4$ and $TiI_4$, titanium trihalides such as $Ti(OCH_3)Cl_3$, $Ti(OC_2H_5)Cl_3$, $Ti(OC_4H_9)Cl_3$, $Ti(OC_2H_5)Br_3$ and $Ti(O(i-C_2H_5))Br_3$, alkoxy titanium dihalides such as $Ti(OCH_3)_2Cl_2$, $Ti(OC_2H_5)_2Cl_2$, $Ti(OC_4H_9)_2Cl_2$ and $Ti(OC_2H_5)_2Br_2$, alkoxy titanium monohalides such as $Ti(OCH_3)_3Cl$, $Ti(OC_2H_5)_3Cl$, $Ti(OC_4H_9)_3Cl$ and $Ti(OC_2H_5)_3Br$, tetraalkoxy titanium such as $Ti(OCH_3)_4$, $Ti(OC_2H_5)_4$, $Ti(OC_4H_9)_4$ and mixtures thereof. Among these the halogen-containing titanium compounds, particularly titanium tetrahalides, more particularly titanium tetrachlorides are preferred.

These titanium compounds are used at least 1 mole, commonly 3 moles to about 200 moles, preferably about 5 moles to 100 moles per mole of magnesium compounds.

When contacting magnesium compounds with titanium compounds in the liquid state, it is preferable that the reaction temperature is maintained at low temperature during mixing, and then gradually increased. For example, the contacting reaction of the two compounds is conducted at −70° C. to about 50° C. so that the reaction does not proceed rapidly, and then the reaction temperature is gradually increased and maintained for a sufficient time at 50° C. to 150° C., then the products are washed with hydrocarbons used in the polymerization reaction until the free titanium is not detected. According to this preparation method for the catalyst, solid titanium catalyst with high performances can be prepared.

It is preferable that the solid titanium catalyst used in the present invention has more than about 4 of halogen/titanium molar ratio, and does not substantially liberate free titanium compounds by washing with hexane at room temperature. Preferable examples of a solid titanium catalyst are catalysts in which the halogen/titanium molar ratio is about 4 or more, more preferably about 5 or more, most preferably about 8 or more, the magnesium/titanium molar ratio is in the range of about 3 or more, more preferably about 5 to 50 and the electron donor/titanium molar ratio is about 0.2 to about 6, more preferably about 0.4 to about 3, further more preferably about 0.8 to about 2. Further, specific area of the solid is 10 $m^2$/g or more, more preferably 50 $m_2$/g or more, most preferably 100 $m^2$/g or more. It is preferable that the X-ray spectrum of the solid titanium catalyst represents amorphous properties irrespective of the starting magnesium compounds or more amorphous state than the common magnesium dihalides of the commercial grade.

To prepare the prepolymerized catalyst a solid complex titanium catalyst as above mentioned is treated with silane compounds having two or more vinyl groups. Examples of the divinyl type silane compounds used at this stage are divinyl dimethyl silane, divinyl diphenyl silane, divinyl diethyl silane, divinyl diisobutyl silane, divinyl silane dihydride. These compounds are used in the amount of 2 mole to 200 moles per mole of magnesium compounds when they are used in the surface treatment. The reaction between the solid titanium catalyst and these compounds for surface treatment is conducted by contacting these two compounds at −70° C. to 50° C. and at this time, solvents may or may not be used.

To prepare the prepolymerized catalyst, the prepolymerization reaction is carried out against the solid titanium catalyst thus surface treated. The prepolymerization process is conducted by reacting olefin monomers with diene compounds at a temperature of −50° C. to 50° C. in the presence of the above surface treated solid titanium catalyst, aluminum alkyl and electron donors, thereby polymerizing macromonomers on the surface of the catalyst through the simultaneous reaction of compounds having double bond and treated on the catalyst surface, olefin monomers and diene compounds. The macromonomers are composed of olefins, silane compounds having double bonds and dienes and encapsulates the catalyst surface of the solid titanium catalyst. The composition of olefin, diene and silane compounds in the macromonomers thus produced is composed of 1 to 99 percent of olefins, 0.01 to 10 weight percent dienes, 0.001 to 1 weight percent of silane compounds. Among these, preferably the compounds are composed of 70 to 95 percent of olefins, 0.1 to 5 weight percent dienes, 0.01 to 1 weight percent of silane compounds. Examples of olefin monomers used at this stage are one or more compounds selected from the group consisting of ethylene, propylene, 1-butene, 1-hexene and 1-octene, and diene compounds are 1,3-butadiene, 1,5-hexadiene, 1,7-octadiene, 1,9-decadiene or 1,13-tetradecadiene etc.

The macromonomers polymerized around the catalyst are reacted with propylene monomers during the main polymerization reaction and thereby forms long chain branches or networks. The molecular weight of these macromonomers is preferably in the range of 500 to 100,000, and among these, the compounds which show excellent polymerization activities in the main polymerization reaction are molecules having molecular weight of in the range of 1000 to 10,000.

The prepolymerized catalyst thus produced is useful for polymerization of olefins such as ethylene, propylene, 1-butene, 3-methyl-1-butene, 4-methyl-1-butene, vinylcycloalkane or cycloakane. Particularly, these catalysts are useful for polymerization of α-olefins having 3 or more carbon atoms, copolymerization between these compounds, copolymerization between these compounds having 20 mole percent or less of ethylene and copolymerization between polyunsaturated compounds such as conjugated or nonconjugated dienes.

The method for olefin polymerization includes polymerizing or copolymerizing olefins in the presence of catalyst system which is composed of component (a), (b) and (c):

(a) the prepolymerized catalyst produced by above mentioned method, i.e, macromonomer encapsulated-prepolymerized catalyst which is obtained by prepolymerizing olefin and diene compounds with solid titanium compounds which includes magnesium compounds, titanium compounds, electron donors and silane compounds having 2 or more double bonds.

(b) Organometallic compounds of Group I or III metals of the Periodic Table.

(c) external electron donors.

Examples of the organometallic compounds used as cocatalyst in the polymerization method of the present invention are trialkylaluminum such as triethylaluminum and tributylaluminum, trialkenylaluminum such as triisoprenylaluminum, partially alkoxylated alkylaluminum (for example, dialkylaluminumalkoxide such as diethylaluminumethoxide and dibutylaluminumbutoxide, alkylaluminum sesquialkoxide such as ethylaluminum sesquiethoxide and butylaluminum sesquiethoxide), alkylaluminum halides such as ethylaluminum dichloride, propylaluminum dichloride and butylaluminum dibromide, partially halogenated aluminum, aluminum hydride, dialuminum hydride such as diethylaluminum hydride and diethylaluminum hydride and partially alkoxylated halogenated alkylaluminum such as butylaluminum butoxychloride and ethylaluminum ethoxybromide.

External electron donors(c) used in the polymerization method of the present invention may be any external electron donor material which is conventionally used in the polymerization of olefins. Such external electron donors are generally used to optimize the catalytic activities and stereoregularities in the olefin polymerization process. Examples of the external electron donors include organic compounds containing oxygen, silicon, nitrogen, sulfur and phosphorus atoms such as organic acid, organic acid anhydride, organic acid ester, alcohol, ether, aldehyde, ketone, silane, amine, amine oxide, amide, diol, phosphate ester and mixtures thereof. Particularly preferable external electron donors are organic silicon compounds having alkoxy groups, i.e, alkoxy silane, and examples of these compounds include aromatic silanes such as diphenyldimethoxy silane, phenyltrimethoxy silane, phenylethyldimethoxy silane and phenylethyldimethoxy silane, aliphatic silanes such as isobutyltrimethoxy silane, diisobutyldimethoxy silane, diisopropyldimethoxy silane, di-t-butyldimethoxy silane, t-butyltrimethoxy silane, cyclohexylmethyldimethoxy silane, dicyclopentyldimethyldimethoxy silane, dicyclohexyldimethoxy silane, 2-novonantriethoxy silane, 2-novonanmethyldimethoxy silane and vinyltriethoxy silane and mixtures thereof, among these compounds, particularly branched alkyl dialkoxy silane such as diisobutyl dimethoxy silane and cycloalkyl dialkoxy silane such as dicyclopentyl dimethoxy silane are effective. The above compounds maybe used as alone or as mixtures thereof.

When the polymerization method is applied to liquid state polymerization, inactive solvents such as hexane, heptane or kerosene may be used as a reaction medium, and also the olefin itself may be used as reaction medium. In the case of a liquid state polymerization process, the preferable concentration of the prepolymerized catalyst(a) in the polymerization reaction system is about 0.001 to about 5 mmol, more preferably about 0.001 to about 0.5 mmol, calculated in the basis of titanium atoms in the 1 liter of solvents. In the case of gaseous state polymerization, the preferable amount of the prepolymerized catalyst(a) is about 0.001 to about 5 mmol, more preferably about 0.001 to about 1.0 mmol, further preferably 0.01 to about 0.5 mmol, calculated in the basis of titanium atoms in the 1 liter of polymerization zone. Also, the ratio of organometallic atoms in the component(b) is about 1 to 2,000 mol, preferably about 5 to 500 mol per mole of titanium atom in the catalyst(a) and the ratio of external electron donors (component(c)) is about 0.001 to 10 mol, preferably about 0.01 to 2 mol, more preferably about 0.05 to 1 mol per mole of organometallic atoms in the component(b), calculated on the basis of nitrogen or silicon atoms.

The olefin polymerization or copolymerization in the presence of the catalyst system of the present invention is conducted in the same way as in the olefin polymerization process using a conventional Ziegler-type catalyst. Particularly, the polymerization or copolymerization is conducted in the absence of oxygen or water. The polymerization reaction of olefins may be conducted, preferably at temperature of about 20° C. to 200° C., more preferably about 50° C. to 180° C. and under the pressure of atmospheric pressure to 100 atms, more preferably about 2 to 50 atms. The polymerization may be conducted bacthwise, semibachwise or continously, or it can be conducted in the steps more than 2 having different reaction conditions.

The following Examples and Comparative examples illustrate the present invention more specifically. However, the present invention is not limited thereto.

EXAMPLE 1

Preparation of the Prepolymerized Catalyst(a)

Step 1: Preparation of the Solution of Magnesium Compounds

A mixture of $MgCl_2$ 15 g, $AlCl_3$ 4.2 g and toluene 550 ml was added to 1.0 l reaction vessel which is replaced with nitrogen atmosphere and equipped with a mechanical agitator, and the reaction vessel was agitated at 400 rpm, and then after adding tetrahydrofuran 30 ml, butanol 28 ml, ethanol 1.4 ml, silicon tetraethoxide 1.5 ml and tributylphosphate 3.0 ml to the reaction vessel and the temperature was raised to 105° C., and then the reaction was conducted at this temperature for 4 hours. The uniform solution obtained after the completion of reaction was cooled to room temperature.

Step 2: Preparation of Solid Support Materials

The magnesium solution prepared in the step 1 was transferred to a 1.6 l reaction vessel whose temperature was maintained at 13° C. The agitation speed was controlled at 350 rpm, and then $TiCl_4$ 15.5 ml was added and the reaction temperature was raised to 90° C. During this processes, solid support materials are precipitated. The reaction was continued for 1 hour at 90° C. and then the agitation was stopped, thereby precipitated the solid support materials produced. After the completion of precipitation process, the solid support material separated from supernatants was washed with 75 ml of toluene two times.

Step 3: Preparation of the Solid Titanium Catalyst

After adding toluene 100 ml and $TiCl_4$ 100 ml to the solid support material, the temperature of the reaction vessel was raised to 110° C. and maintained for 1 hour at this temperature. Agitation was stopped, the solid support material was precipitated and then supernatant was separated, and toluene 100 ml and $TiCl_4$ 100 ml was added and then diisophthalate 2.9 ml was added. The temperature of the reaction vessel was raised again to 120° C. and the reaction vessel was agitated for 1 hour. Agitation was stopped, the supernatant was separated, and then adding toluene 100 ml, reaction vessel temperature was cooled to 70° C. and the reaction vessel was agitated for 30 minutes. Agitation of the reaction vessel was stopped and the supernatant was separated, and then the solid titanium catalyst was prepared by adding $TiCl_4$ 100 ml and agitating for 30 minutes at 70° C.

Step 4: Surface Treatment of the Solid Titanium Catalyst

The solid titanium catalyst thus prepared was washed 5 times with purified hexane 75 ml, and then hexane 500 ml and divinyldimethyl silane 50 ml was added and the reaction was carried out for 1 hour at room temperature. The catalyst thus prepared was dried under the nitrogen atmosphere and then stored. The surface treated solid titanium catalyst was contained 2.5 weight percent of titanium atom.

Step 5: Prepolymerization

A 0.5 l reaction vessel for high pressure reaction was washed with propylene, and then 2 g of catalyst obtained in the above step 4, hexane 300 ml, triethylaluminum 6 mmol, hexadiene 20 ml was added to this reaction vessel, the pressure was controlled to 0.9 atm with ethylene, and then the polymerization reaction was conducted for 5 hours at 20° C. For the prepolymerized catalyst thus obtained, the amount of macromonomers polymerized around the catalyst was 31.0 g per 1 g catalyst.

Step 6: Polymerization

A 2 l reaction vessel for high pressure reaction was washed with propylene, and then 20 mg of prepolymerized catalyst thus prepared and contained within a glass bottle was placed within this reaction vessel, and after the inside of the reaction vessel was made into nitrogen state/vacuum state three times alternatively, and then made into atmospheric pressure state. Triethylaluminum 7 mmol, dicyclopentyldimethoxy silane 0.5 mmol, diisopropyldimethoxy silane 0.5 mmol was added to the reaction vessel. Further, hydrogen 300N ml was added, and subsequently propylene in the liquid state 1,200 ml was added, and then the temperature was raised to 65° C. while agitating, the polymerization reaction was conducted for 1 hour at this temperature. After the completion of the polymerization reaction, unreacted gases were exhausted, after the reaction vessel was cooled to room temperature, it was disassembled. The polymers thus obtained were collected and dried in a vacuum oven for more than 6 hours at 50° C. As a result, a white polymer was obtained.

Step 7: Measurement of the Melt Strength

The melt strength of the polymer prepared according to the above polymerization method was measured by measuring the melt strength of the strand that is coming out of the die of extruder (Blabender) at 220° C. by using Reotense (Q ötFerster, Germany), and the result was shown in the following Table I. When measuring, the diameter of the die was 2 mm, the distance from the entrance of the die to Reotense roller was 10 cm.

EXAMPLE 2

The present example is same as in the example 1 except that 0.1 mmol of dicyclopentyldimethoxy silane was added during the prepolymerization reaction of the macromonomers, and the melt strength of the polymer thus prepared was measured, the result was shown in the following Table I.

EXAMPLE 3

The present example is same as in the example 1 except that 0.5 mmol of dicyclopentyldimethoxy silane was added during the prepolymerization reaction of the macromonomers, and the melt strength of the polymer thus prepared was measured, the result was shown in the following Table I.

EXAMPLE 4

The present example is same as in the example 1 except that 1.0 mmol of dicyclopentyldimethoxy silane was added during the prepolymerization reaction of the macromonomers, and the melt strength of the polymer thus prepared was measured, the result was shown in the following Table I.

EXAMPLES 5

The present example is same as in the example 1 except that the amount of hydrogen was 1,000N ml during the polymerization reaction, and the melt strength of the polymer thus prepared was measured, the result was shown in the following Table I.

EXAMPLES 6

The present example is same as in the example 1 except that 4 mmol triethylaluminum, 4 mmol triisobutylaluminum was added and polymerized in the polymerization reaction, and the melt strength of the polymer thus prepared was measured, the result was shown in the following Table I.

EXAMPLE 7

The present example is same as in the example 1 except that 10N ml of hydrogen was added during the prepolymerization reaction of the macromonomers, and the result was shown in the following Table I.

EXAMPLES 8

The present example is same as in the example 1 except that propylene monomer was used instead of ethylene monomer during the prepolymerization reaction of the macromonomers, and the result was shown in the following Table I.

Comparative Example 1

The present example is same as in the example 1 except that the prepolymerization reaction of the macromonomers was not conducted, and the melt strength of the polymer thus prepared was measured, the result was shown in the following Table I.

TABLE 1

| | Polymerization activity (kg-PP/g-cat) | MI (g-PP/10 min) | Melt strength (mN) |
|---|---|---|---|
| Example 1 | 31 | 0.5 | 115 |
| Example 2 | 30 | 0.6 | 154 |
| Example 3 | 28 | 0.6 | 167 |
| Example 4 | 29 | 0.7 | 160 |
| Example 5 | 33 | 1.7 | 104 |
| Example 6 | 28 | 1.3 | 121 |
| Example 7 | 30 | 0.7 | 115 |
| Example 8 | 31 | 1.0 | 97 |
| Comparative example 1 | 36 | 1.5 | 40 |

As shown in above Examples and Comparative Examples, according to the polymerizaton method of the present invention using prepolymerized catalyst, the melt strength of the polymer can be increased without causing big changes in the polymerization activity in comparison with the polymerization method using conventional catalyst.

As a result, by using the present catalyst for olefin polymerization and the method for the same, the polyolefin with melt strength suitable for the use of process which is carried out in the melt state such as foaming, heat shaping and extrusion coating can be effectively provided.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A catalyst for olefin polymerization encapsulated with macromolecular monomers around the catalyst which is produced by treating the surface of a solid titanium catalyst for olefin polymerization with silane compounds having two or more vinyl groups and then prepolymerizing said surface treated solid titanium catalyst with olefin monomers and diene compounds.

2. The catalyst of claim 1, wherein said solid titanium catalyst is produced by: (i) preparing magnesium compound solutions by dissolving magnesium compounds having no reducibility in electron donors, (ii) reacting said magnesium compound solutions with transition compounds, silicon compounds, tin compounds or a mixture thereof and precipitating solid particles, and then (iii) reacting said precipitated solid particles with titanium compounds and electron donors.

3. The catalyst of claim 1, wherein said silane compound having two or more vinyl groups is divinyldimethylsilane, divinyldiphenylsilane, divinyldiethylsilane, divinyldiisobutylsilane or divinyldihydridesilane.

4. The catalyst of claim 1, wherein the amount of said silane compounds having two or more vinyl groups used is 2~200 moles per 1 mole of magnesium compound.

5. The catalyst of claim 1, wherein said olefin monomer is more than one monomer selected from the group consisting of ethylene, propylene, 1-butene, 1-hexene, and 1-octene.

6. The catalyst of claim 1, wherein said diene compound is 1,3-butadiene, 1,5-hexadiene, 1,7-octadiene, 1,9-decadiene or 1,13-tetradecadiene.

7. The catalyst of claim 1, wherein said macromolecular monomers encapsulating around the catalyst have a molecular weight in the range of 500 to about 100,000, and is composed of 1 to about 99 weight percent of olefin, 0.01 to about 10 weight percent of diene, and 0.001 to about 1 weight percent of silane materials.

8. A method for olefin polymerization which is conducted by contacting a catalyst system comprising (a) a catalyst for olefin polymerization encapsulated with macromolecular monomers around the catalyst which is producted by treating the surface of a solid titanium catalyst for olefin polymerization with silane compounds leaving two or more vinyl groups and then prepolymerizing said surface treated solid titanium catalyst with olefin monomers and diene compounds, (b) an organometallic compound of Group I or III metals of the Periodic Table and (c) external electron donors with (d) an α-olefin.

9. The method of claim 8, wherein said organometallic compound of the (h) component is trialkylaluminium.

10. The method of claim 8, wherein said external electron donors is an alkoxysilane compound.

11. The method of claim 8, wherein said solid titanium catalyst is produced by (i) preparing magnesium compound solutions by dissolving magnesium compounds having no reducibility in electron donors, (ii) reacting said magnesium compound solutions with transition compounds, silicon compounds, tin compounds or a mixture thereof and precipitating solid particles and then (iii) reacting said precipitated solid particles with titanium compounds and electron donors.

12. The method of claim 8, wherein said silane compound having two or more vinyl groups is divinyldimethylsilane, divinyldiphenylsilane, divinyldiethylsilane, divinyldiisobutylsilane or divinyldihydridesilane.

13. The method of claim 8, wherein the amount of said silane compounds having two or more vinyl groups used is 2 to 200 moles per 1 mole of magnesium compound.

14. The method of claim 8, wherein said olefin monomer is more than one monomer selected from the groups consisting of ethylene, propylene, 1-butene, 1-hexene, and 1-octene.

15. The method of claim 8, wherein said diene compound is 1,3-butadiene, 1,5-hexadiene, 1,7-octadiene, 1,9-decadiene or 1,13-tetradecadiene.

16. The method of claim 8, wherein said macromolecular monomers encapsulating around the catalyst have a molecular weight in the range of 500 to about 100,000, and is composed of 1 to about 99 weight percent of olefin 0.01 to about 10 weight percent of diene, and 0.001 to about 1 weight percent of silane materials.

* * * * *